Sept. 11, 1923.
J. G. ROSILLO
VEHICLE WHEEL
Filed Aug. 22, 1921
1,467,334
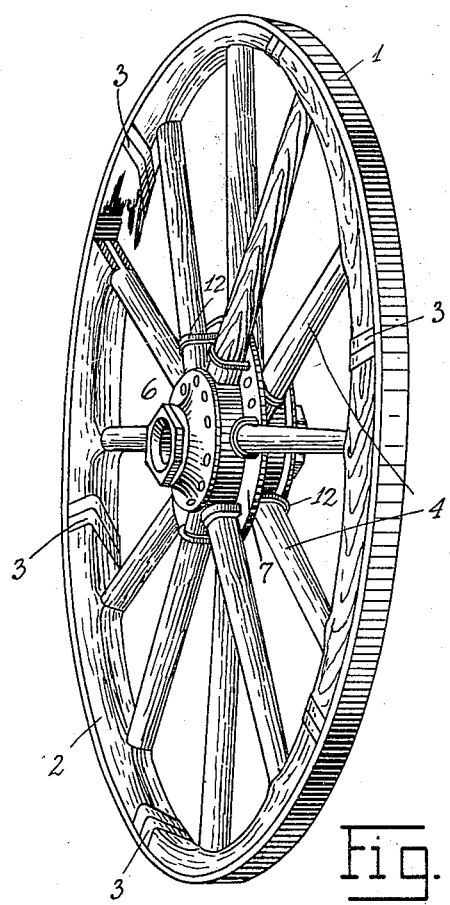
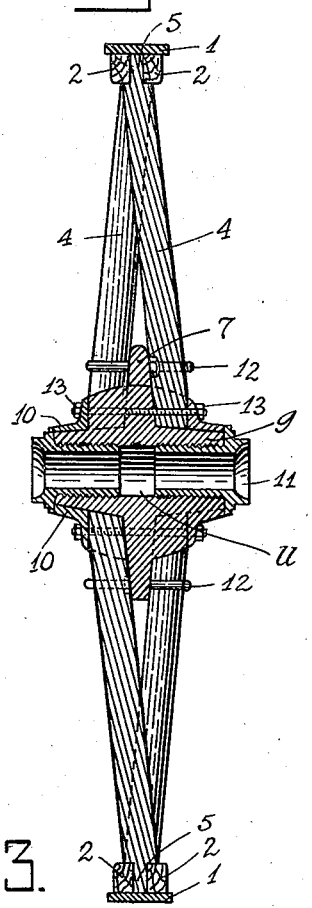
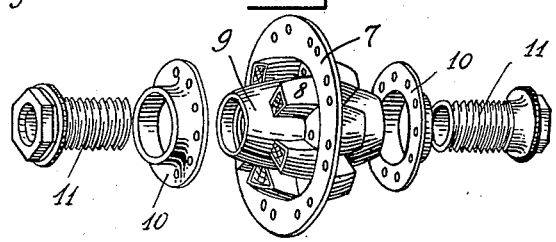
INVENTOR
José G. Rosillo
BY *Looka, Kehlenbeck & Math*
ATTORNEYS.

Patented Sept. 11, 1923.

1,467,334

UNITED STATES PATENT OFFICE.

JOSÉ GUADALUPE ROSILLO, OF MEXICO, MEXICO.

VEHICLE WHEEL.

Application filed August 22, 1921. Serial No. 494,113.

*To all whom it may concern:*

Be it known that I, José Guadalupe Rosillo, a citizen of the Republic of Mexico, residing at Mexico city, Federal District, Republic of Mexico, have invented certain useful Improvements for Vehicle Wheels, of which the following is a complete specification.

My invention relates to certain useful improvements for vehicle wheels by virtue of which a stronger wheel is obtained, crushing of the wheel and breaking of the spokes being avoided, be it in case of rough roads or in case of overloading of the vehicle; no removal of the iron tire is required either for removing or resetting the spokes, but the hub only is to be removed for this purpose.

The accompanying drawing graphically represents my invention with all its details and improvements; Fig. 1 is a perspective view of the improved wheel complete and already set up with all its component parts; Fig. 2 is a section across wheel centre showing the inside construction of the steel hub as well as the spoke arrangement; Fig. 3 shows a perspective view of the hub with its different members taken apart, spoke sockets, bushings, flange, etc.

The same parts are designated with the same figures in the drawing.

Referring to drawings, num. 1 represents the iron tire of the wheel; 2. 2. are the felloe segments; 3. 3. shows the joints of these segments, said joints being disposed obliquely or diagonally so as to obtain perfect adjustment of the felloe segments, the ends being fitted with brass caps for edge protection; 4. 4. are the wooden spokes of the wheel inclined alternately in opposite directions to form two staggered rows, the outer ends of all the spokes fitting into the felloe; 5. 5. show the spoke tenons fitting into the felloe; 6. is the wheel hub, made for instance of steel or other metal and shown in detail in Fig. 3; 7 is a metallic ring or hub flange located at the central portion of the hub and having its opposite surfaces converging outwardly, that is to say, away from the wheel axis, and against these surfaces bear the correspondingly inclined inner ends of the spokes 4; 8 are sockets formed in the outer portion of the hub, at each side of the flange 7, to receive the inner ends of the spokes, which ends are cut off at a slant, as shown in Fig. 2, to properly fit the slightly tapered outer surface of the hub sleeve 9, so as to obtain a strong construction of the wheel throughout. Between each two adjacent spoke ends there is a filled-in wooden mortise. The hub sleeve 9 has a cylindrical bore screw-threaded to receive bushings 11 which are fitted on the axle (not shown), and the portion of the bore between the spaced adjacent ends of said bushings forms a grease-box. The outer ends of the bushings are made with angular heads (see Figs. 1 and 3) for the application of a wrench. On the sides farthest from the flange 7, the inner ends of the spokes 4 are engaged by rings or plates 10, fitted on the outside of the hub sleeve 9. Clips 12 of the well-known character clamp the inner portions of the spokes to the hub flange 7, and bolts 13, with nuts at their ends, connect the two plates 10 and press them toward each other and against the edges of the spoke sockets on the hub.—If desired, the construction may be increased in strength by securing the spoke tenons 5 to the felloe segments 2 by means of screws (not shown).

I have herein shown and particularly described a certain embodiment of my invention for the purpose of explaining its principles and illustrating its applications, but it is to be understood that I do not mean to limit myself to the said embodiment, and that numerous modifications of the details of construction, materials and arrangement of this embodiment, and other applications will readily present themselves to those skilled in the art. I, therefore, wish to cover by the following claims all modifications within the spirit of my invention.

I claim as my invention:

1. A wheel having a rim portion, a hub portion having a central flange and, at each side of such flange, circumferential tapered surfaces flaring toward said flange, and also provided with staggered projections located alternately on opposite sides of said flange and spaced to form sockets, and spokes the outer ends of which are connected with said rim portion and the inner ends of which are fitted into said sockets.

2. A wheel having a rim portion, a hub portion having an annular flange, and, at each side of said flange, staggered projections located alternately on opposite sides of such flange and spaced to form sockets, and spokes the outer ends of which are connected with said rim portion while their inner ends are fitted into said sockets.

3. A wheel having a rim portion, a hub portion provided with an annular flange and, at each side of such flange, with circumferential tapered surfaces flaring toward said flange, spokes the outer ends of which are connected with said rim portion, while their inner ends are fitted against said flange and against said tapered surfaces and are beveled to fit the surfaces flaring toward the flange, and means for pressing the inner ends of the spokes toward said flange and wedging them on said tapered surfaces of the hub portion.

JOSÉ GUADALUPE ROSILLO.